US00RE40431E

(19) United States
(12) Reissued Patent
Robitschko et al.

(10) Patent Number: US RE40,431 E
(45) Date of Reissued Patent: Jul. 15, 2008

(54) METHOD OF REGULATING AN INTERNAL COMBUSTION ENGINE

(75) Inventors: Reinhard Robitschko, Jenbach (AT); Herbert Schaumberger, Schwaz (AT); Johann Hirzinger, Kössen (AT); Albert Fahringer, Kössen (AT)

(73) Assignee: GE Jenbacher GmbH & Co OHG, Jenbach (AT)

(21) Appl. No.: 11/882,761

(22) Filed: Aug. 3, 2007

Related U.S. Patent Documents

Reissue of:
(64) Patent No.: 7,191,772
Issued: Mar. 20, 2007
Appl. No.: 11/134,083
Filed: May 20, 2005

(30) Foreign Application Priority Data

May 21, 2004 (AT) ..... A 888/2004

(51) Int. Cl.
*F02D 41/14* (2006.01)
*F02B 13/00* (2006.01)
*G06F 19/00* (2006.01)

(52) U.S. Cl. ..... 123/674; 123/299; 123/527; 123/575; 123/679; 701/109

(58) Field of Classification Search ..... 123/1 A, 123/3, 27 R, 27 GE, 525–529, 299, 300, 123/478, 480, 575, 576, 672, 674, 679, DIG. 12; 261/26, 35; 48/199 FM; 701/103–105, 109
See application file for complete search history.

(56) References Cited

U.S. PATENT DOCUMENTS 5,666,923 A 9/1997 Collier et al.
6,202,601 B1 3/2001 Ouellette et al.
6,520,142 B2 2/2003 Nogi et al.
6,880,812 B2 4/2005 Nonaka
7,191,772 B2 * 3/2007 Robitschko et al. ..... 123/674
2002/0020388 A1 2/2002 Wright et al.
2002/0092498 A1 7/2002 Plohberger et al.
2002/0185086 A1 12/2002 Newman et al.

FOREIGN PATENT DOCUMENTS

| | | |
|---|---|---|
| DE | 197 54 353 A1 | 12/1997 |
| EP | 0 259 382 | 10/1989 |
| EP | 1 225 330 | 4/2006 |
| JP | 2000-008897 | 1/2000 |
| JP | 53-070219 | 5/2002 |
| JP | 2002-155809 | 5/2002 |
| JP | 2004-116398 | 4/2004 |
| WO | WO 01/59285 A2 | 8/2001 |
| WO | 03/076788 | 9/2003 |

* cited by examiner

*Primary Examiner*—Willis R. Wolfe, Jr.
(74) *Attorney, Agent, or Firm*—Wenderoth, Lind & Ponack, L.L.P.

(57) ABSTRACT

Method of regulating an internal combustion engine in order to reach presettable nitrogen oxide emission values of the internal combustion engine, wherein the internal combustion engine is supplied at least some of the time with a first fuel and at least some of the time with a second fuel, the quantity of the first fuel supplied to the internal combustion engine per unit of time being controlled according to a preset control actual value or kept constant and the quantity of the second fuel supplied to the internal combustion engine per unit of time to reach a presettable nitrogen oxide emission value being regulated according to at least one recorded engine parameter.

26 Claims, 5 Drawing Sheets

METHOD OF REGULATING AN INTERNAL COMBUSTION ENGINE

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority to Austrian Application No. A 888/2004, filed May 21, 2004, the contents of which are incorporated by reference in their entirety.

BACKGROUND OF THE INVENTION

The present invention relates to a method of regulating an internal combustion engine, in particular with a lean operating mode, in order to reach presettable nitrogen oxide emission values of the internal combustion engine. The invention also relates to a corresponding regulator and internal combustion engine.

It is already known from EP 0 259 382 B1 to operate an internal combustion engine for driving an electric generator with constant nitrogen oxide emission values, by regulating the mixture pressure before the inlet valves of the cylinders according to the electric output delivered by the generator. The target value of the mixture pressure in the intake before the inlet valves is taken from a characteristics field which shows the dependency of the mixture pressure on the delivered electric output with constant emission values. The measured actual value of the pressure before the inlet valves is then regulated, via an adjustment of the fuel-to-air ratio in a gas mixer, to its target value determined via the characteristics field. The characteristics field used for this is produced by gauging at least two operating points with identical $NO_x$ emission values. It is possible, through this previously known method, that an internal combustion engine can very precisely observe the desired emission values in a wide output range. The system known from the named European patent has the advantage that there is practically no wear and ageing of sensitive sensors.

A further improved system according to the preamble is presented in the European patent application EP 1 225 330 A2, in which the regulation scheme known from EP 0 259 382 B1 has been supplemented by an ignition point adjustment in order to provide, in every operating condition, a regulation reserve for rapid reaction to load changes. This regulation also serves to always run the internal combustion engine with an optimum degree of efficiency.

Each of the previous regulation methods is designed only for operation with one fuel type. However, there are also internal combustion engines—principally stationary—which are operated with two different fuel types. No regulation method with which the reaching of presettable nitrogen oxide emission values is assured is known to date for such engines.

SUMMARY OF THE INVENTION

The object of the present invention is therefore to create such a regulation method for internal combustion engines.

This is achieved according to the invention by supplying the internal combustion engine at least some of the time with a first fuel and at least some of the time with a second fuel, the quantity of the first fuel supplied to the internal combustion engine per unit of time being controlled either according to a control target value preset or kept constant, and the quantity of the second fuel supplied to the internal combustion engine per unit of time being regulated according to at least one recorded engine parameter in order to reach the presettable nitrogen oxide emission value.

An idea underlying the present invention is thus, in the case of internal combustion engines which are operated at least some of the time, with two different fuel types, to control in an open-loop mode the volume flow (=quantity supplied to the internal combustion engine per unit of time) of the one first fuel according to fixed preset values or to keep it constant. During this time, the internal combustion engine is regulated in a closed-loop mode via the volume flow of the other second fuel such that the exhaust gases given off observe the preset emission values. Therefore, it should be clear that "to control" should be understood as open-loop mode operation and "to regulate" should be understood as closed-loop mode operation.

There are various variants for the regulation according to the invention. One which is preferred provides that the quantity of the second fuel supplied to the internal combustion engine per unit of time is regulated by matching a mixture pressure influenced by it in an intake of the internal combustion engine to a mixture pressure target value determined according to the output delivered and the preset nitrogen oxide emission value of the internal combustion engine. This requires a measuring apparatus in the intake which determines the current mixture pressure before the inlet valves. The actual value of the mixture pressure is matched to its target value by suitable setting of the quantity of the second fuel supplied per unit of time.

In another variant, however, instead of the mixture pressure, a corresponding λ-value in the exhaust gas can be measured. With this variant, it is provided that the quantity of the second fuel supplied to the internal combustion engine per unit of time is regulated by matching a λ-value influenced by it in an exhaust of the internal combustion engine to a λ-target value determined according to the output delivered and the preset nitrogen oxide emission value of the internal combustion engine.

As is generally known, in this case the λ-value describes the proportion of air during combustion processes, λ=1 corresponding to a stoichiometric combustion.

The method according to the invention is used particularly preferably with, in particular stationary, gas engines, the first fuel being a combustible gas and/or the second fuel being a second combustible gas. Both the first and the second fuel can be mixtures for example of various gases. It is also possible to add constituents or gases not combustible per se to the first or second fuel, for example in order to burn these.

The method according to the invention can be used particularly favorably if a change of the mixing ratio of the two fuels or a switch of operation of the internal combustion engine from operation with the first fuel to operation with the second fuel is proposed. In both cases, the method according to the invention makes it possible during the whole switch from one to the other fuel or during the whole change of the mixing ratio to operate the internal combustion engine with presettable nitrogen oxide emission values. To this end, in a first operating mode on this side of a presettable operation-switching point the quantity of the first fuel supplied per unit of time is controlled or kept constant and the quantity of the second fuel supplied per unit of time is regulated, and in a second operating mode on the other side of the presettable operation-switching point, the quantity of the second fuel supplied per unit of time is controlled or kept constant and the quantity of the first fuel supplied per unit of time is regulated. The operation-switching point, can be defined via various parameters. A presettable relationship between the quantity of the first fuel supplied per unit of time and the quantity of the second fuel supplied per unit of time conveniently defines the operation-switching point.

BRIEF DESCRIPTION OF THE DRAWINGS

Further details and features of the present invention will be seen in the following description of the figures, in which.

DETAILED DESCRIPTION OF THE INVENTION

Figure 1:
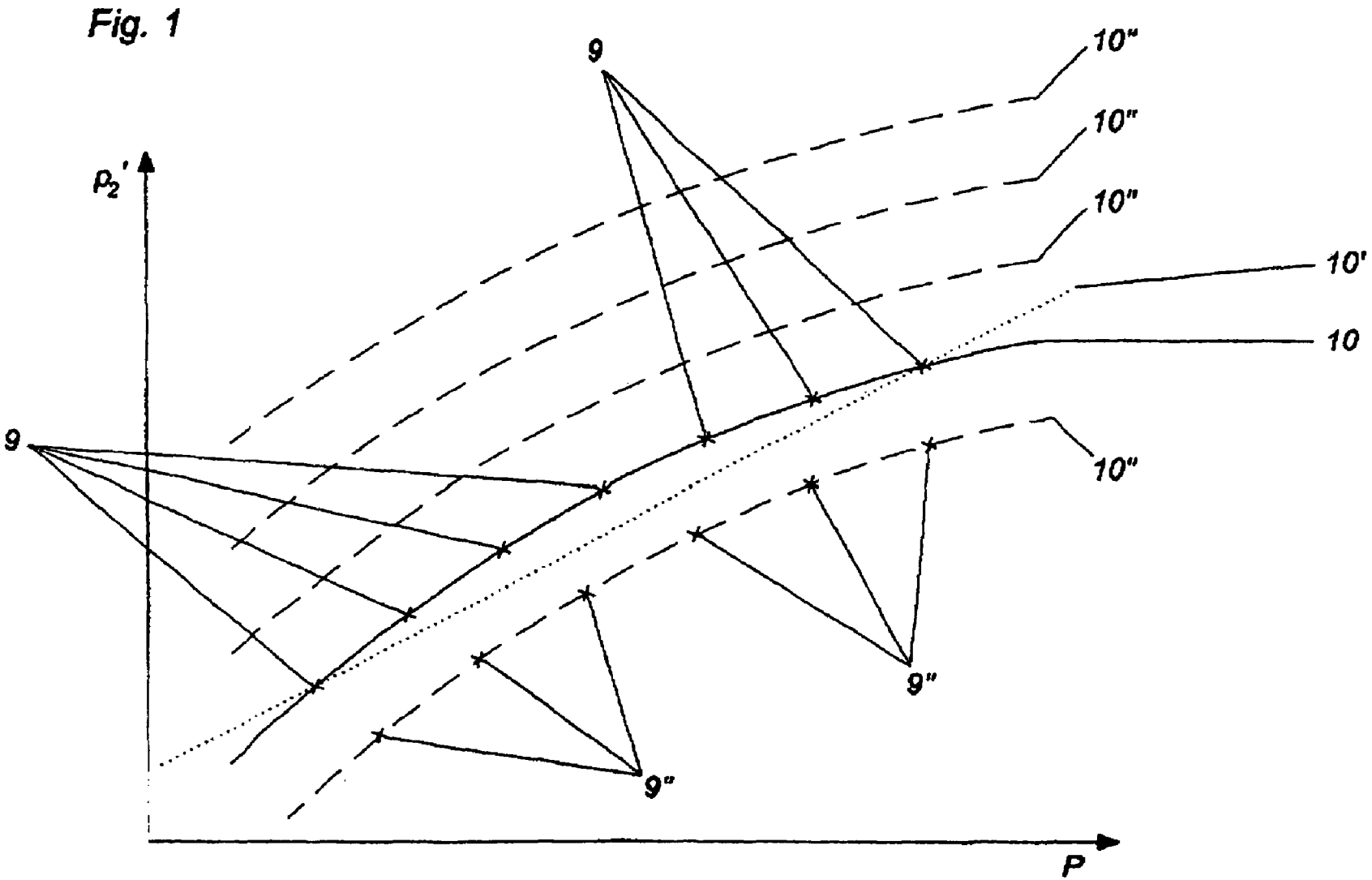
FIG. 1 Is a diagram illustrating the relationship known in the state of the art between the output P delivered by the internal combustion engine and the mixture pressure $p_2$ measured in the intake of the internal combustion engine, FIG. 2 Is a schematic view of an scheme according to the invention, FIGS. 3 and 4 Are schematic view showing details of variations according to the invention of the design of a fuel-mixing apparatus, FIGS. 5 and 6 Are diagrams illustrating the relationships of the output P and the mixture pressure $p_2$ with the help of which the regulation method according to the invention is illustrated, and FIG. 7 Is a diagram showing the pattern over time of the volume flows when switching from an operation with a first fuel type to operation with a second fuel type.

FIG. 1 shows schematically the dependency known in the state of the art of the mixture pressure target value $p_2$ on the output P delivered by the internal combustion engine when operating with one fuel type. Corresponding relationships between the λ-target value and the delivered output P exist analogously and are therefore equally representable. However, because of the need for brevity, further explanation of the method is given essentially with reference to the relationship between $p_2$ and P.

All those operating points of the internal combustion engine which each have a specific nitrogen oxide emission value lie on the shown solid characteristic line 10. The characteristic line or the characteristics field is created by gauging, for example when starting up the internal combustion engine. This happens by setting a mixture pressure at an operating point 9 with given output P such that the desired nitrogen oxide emission value of the internal combustion engine results. This mixture pressure is then the mixture pressure target value $p_2$ at the given output P. In order to create a characteristic line 10, at least a second operating point 9 is then started by correspondingly setting another output value P, with the mixture pressure $p_2$ at which the desired nitrogen oxide emission value is reached again being determined. At first approximation, the two thus-determined operating points 9 result in a characteristic line 10' (shown as a dotted line). This can be linear or run with the help of known polynomials or the like as a bent curve through the operating points 9. If more than two operating points 9 are gauged with the named procedure at a constant nitrogen oxide emission value, a linear or curved pattern (characteristic line 10) can also result from this.

In the case of internal combustion engines in which certain operating parameters, such as for example the temperature $t_2$ of the fuel/air mixture or the ignition point ZZP or the quality of the supplied fuel can alter greatly, it may also be advisable to also take account of the influence of there parameters. A characteristic line generally then results. FIG. 1 shows by way of example various dashed characteristic lines 10" which result in the case of corresponding gauging of operating points 9" in each case at constant nitrogen oxide emission values in each case and different temperature values $t_2$ in each case. When account is taken of several influencing parameters, the overall result is then a multidimensional characteristics field. Alternatively, taking a single characteristic line 10 as a basis, but also corresponding correction values for the temperature of the fuel/air mixture $t_2$ or the ignition point ZZP or the quality of the supplied fuel, further influencing parameters can be taken into account. In order to set limits to the outlay when gauging the characteristics field according to the procedure described above, estimates can also be applied if the influence of a specific parameter is known.

Figure 2:
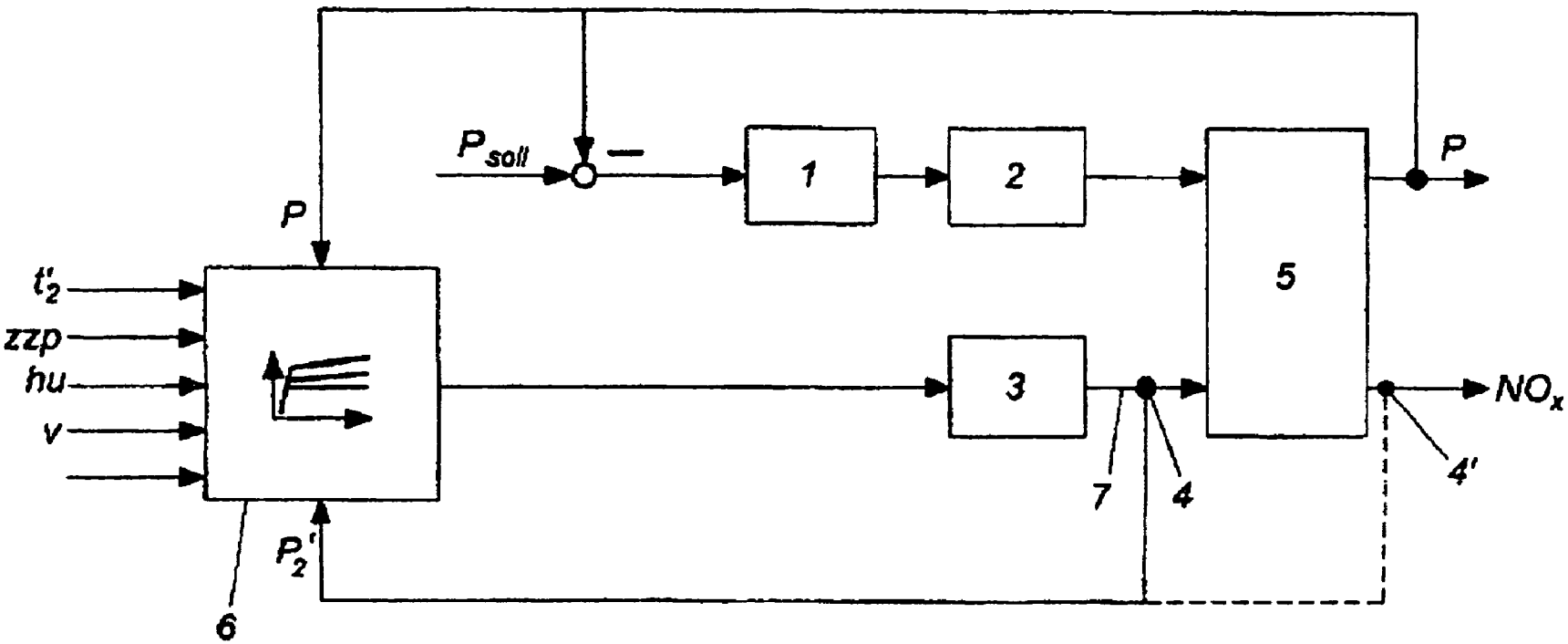
Figure 3:
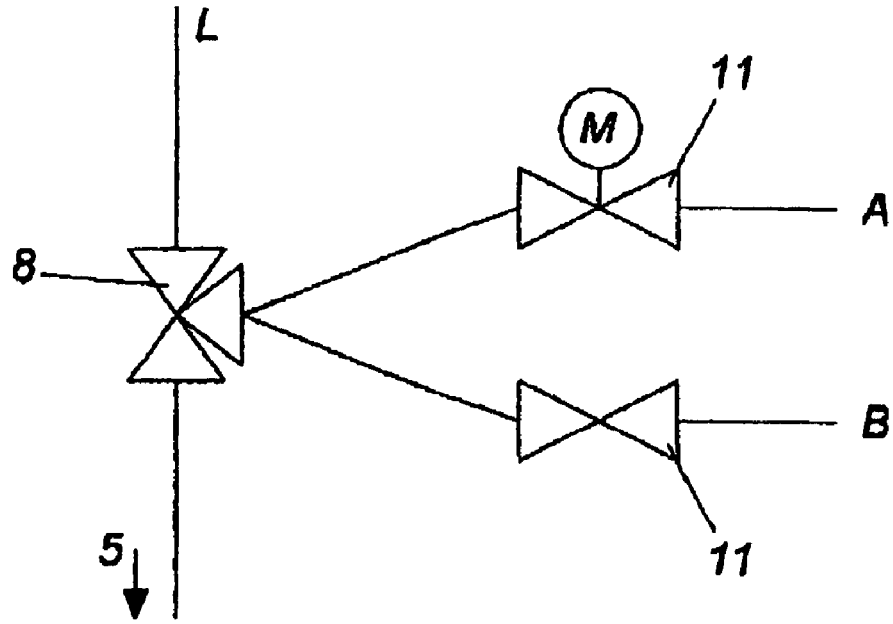
Figure 4:
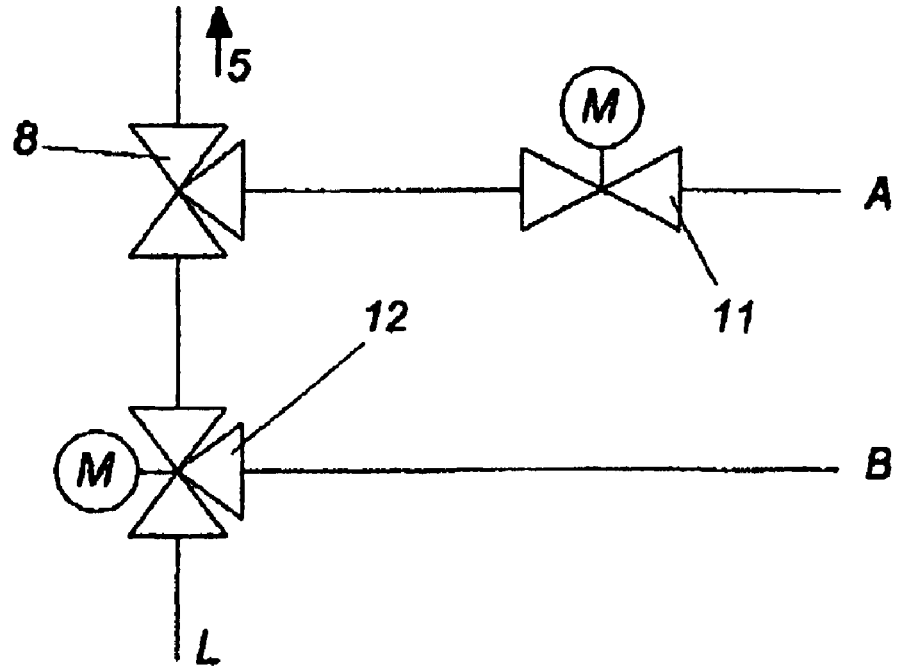

FIG. 2 shows an engine diagram, reduced to essentials, with which the method according to the invention can be carried out. Firstly this shows, as is known per se, an output regulator in which a PID controller 1 adjusts an output servocontrol 2 (for example a throttle valve or an inlet valve) in such a way that the output P delivered by the engine 5 corresponds to the desired output target value $P_{soll}$. According to the invention, a regulation section is provided for the engine 5 with which, to reach constant nitrogen oxide emission values $NO_x$, a fuel mixing device 3 for at least two fuels—as explained further below—is controlled on the one hand and regulated on the other. Version variants according to the invention for the fuel mixing device 3 are represented in FIGS. 3 and 4. These are also explained further below. In FIG. 2 itself, in a first variant, a pressure-measuring apparatus 4 is arranged in the intake 7 arranged behind the fuel mixing device 3 of the engine 5. This supplies the regulator 6 with a current measured value for the mixture pressure before the valves. The variant in which, instead of the mixture pressure, a λ-value is used for regulation is represented by broken lines. This can then be measured in the exhaust by means of a λ-sensor 4' customary in the trade. In this variant also, the measured value is supplied to the regulator 6. In addition to the measured output P and the measured mixture pressure or λ-value, other engine parameters can be supplied to the regulator 6 according to the invention, such as for example the temperature $t_2$ of the fuel mixture or the ignition point ZZP or the lower calorific value hu or the volume flow 'V, in order to then be able to use the multi-dimensional characteristics fields or relationships briefly represented with the help of FIG. 1. The regulator 6 controls the fuel mixing device 3 according to the regulation process of the invention that is once again described in detail further below.

FIG. 3 shows a first embodiment according to the invention for the fuel mixing device 3. In this, two different fuel types A and B (preferably two different combustible gases) are supplied to a mixer 8 via settable volume flow dosage valves 11. In this mixer, the two fuel types A and B are then blended with air to produce a combustible gas mixture which is then supplied to the engine 5. Although the shown mixing device 3 can of course also be used to supply only fuel A or only fuel B to the engine 5, the method according to the invention serves to operate the engine at least part of the time with both fuels or switch the engine from operation with one fuel to operation with the other fuel, while still always reaching presettable nitrogen oxide emission values. According to the invention, it is provided that the volume flow dosage valve of the first fuel type A is controlled or kept constant according to a control target value preset, while the volume flow dosage valve 11 and thus the volume flow of the second fuel type B is regulated according to an engine parameter, or vice versa.

FIG. 4 shows a further variant of a fuel-mixing device 3 which can also be used for a regulation method according to the invention. Here, fuel B is supplied direct to an adjustable mixer 12. This mixes fuel B with air L. This mixture is then supplied to a second mixer 8, where the second fuel type A is also added. The quantity of A supplied per unit of time can in turn be set via the volume flow dosage valve 11. Here, too, according to the invention the volume flow of the one fuel type can be controlled while the volume flow of the other fuel type is regulated in order to reach the presettable nitrogen oxide emission values.

It is explained with reference to FIG. 5 how the respective mixture pressure target value p.sub.2 for various output values P when operating with two different fuel types can now be determined according to the invention. Firstly, characteristic lines 10 must be determined separately from each other for both fuel types, as explained with reference to FIG. 1. When gauging, the internal combustion engine as known in the state of the art is operated in each case with only one fuel, which may also be a mixture or contain non-combustible admixtures.

Figure 5:
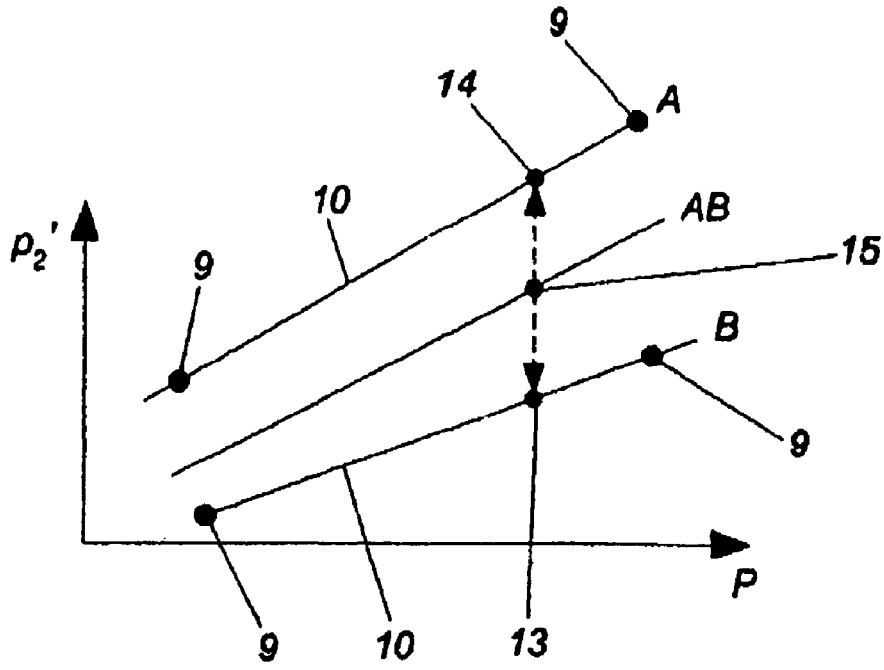

FIG. 5 shows the determination of the mixture pressure target value 15, for the sake of clarity using only one characteristic line 10 for fuel A and only one other characteristic line 10 for fuel B. In addition, only two operating points 9 each have been gauged for both characteristic lines 10. All the operating points 13 and 14 between the gauged operating points 9 can be calculated from these via equations or filed as a characteristics field in a suitable memory of the regulator 6. Instead of a linear interpolation, bent curves as characteristic lines 10 can also be the basis for the calculation of the mixture pressure target value $P_2$ 15. This calculation itself can be realized as an interpolation. Basically it is always a momentary mixture pressure target value $P_2$ 15 which can either be calculated on the basis of the current preset values or filed as a characteristics field.

A favorable variant provides that the calculation is based on the corresponding target values 13 and 14 and a standardization factor x. This can be determined for example according to the calorific value or the $CH_4$ content of the first fuel A or of the second fuel B or of a volume flow of a fuel mixture. The standardization factor x can stand in both a linear and a non-linear relationship with the named parameters. Taking into account that the standardization factor x is standardized to values between 0 and 1, the following calculation rule results for the mixture pressure target value $p_2$ in point 15 (=$p_2$ (15):

$$p_2(\mathbf{15})=p_2(\mathbf{13})+(p_2-(\mathbf{14})-p_2(\mathbf{13}))x$$

Here, $p_2$(13) and $p_2$ (14) are the respective mixture pressure target values are preset with the help of the characteristic lines 10 for fuel type A and fuel type B. According to the thus-calculated mixture pressure target value $p_2$ (15), the corresponding volume flow dosage valve 11 or the corresponding volume flow-controllable gas mixer 12 of the fuel A or B to be regulated is then operated, while the other volume flow dosage valve 11 or the other volume flow-controllable gas mixer 12 for the other fuel is kept constant or controlled according to fixed preset values. The calculation, explained with reference to $P_2$ and P, of the target value 15 operates analogously in the case of a regulation which is based on the λ-value and the output P.

Figure 6:
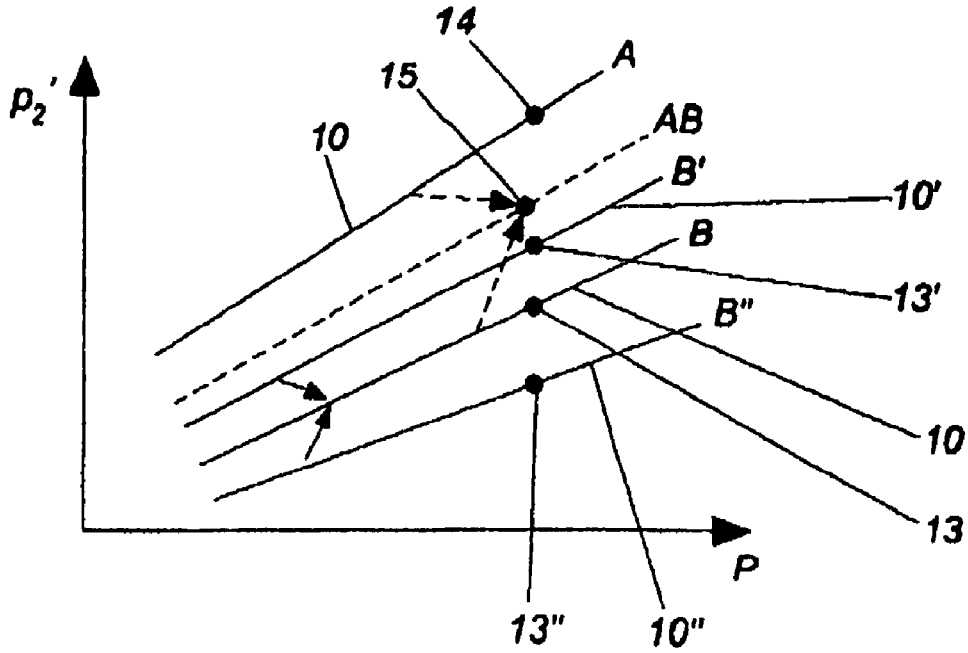

FIG. 6 shows a variant of the invention in which, when calculating the mixture pressure target value $p_2$ (15) or the λ-target value, fluctuations in the quality of the second fuel B must be taken into account, preferably via previously determined characteristics fields or measured values corresponding to correction factors. Thus, there frequently are fluctuations in fuel quality, for example, when using waste gases as fuel. In the shown example in FIG. 6 this is the case for fuel B. Owing to corresponding quality fluctuations, the mixture pressure target values for this fuel type then no longer lie on a characteristic line, but in the area between two characteristic lines 10' and 10". The respective current target value 13 for gas type B must then be determined first, using characteristic lines 10' and 10" gauged as usual, from the values 13' and 13". An analogous standardization function to that used to determine $p_2$ (15) can be used for this calculation, the standardization factor x being replaced by another standardization factor y. y can for its part be determined, for example, via the current calorific value or the current composition of the fuel and depend on this in a linear or non-linear manner. If the mixture pressure target value $p_2$ (13) characteristic of the current quality of the fuel B is calculated, the mixture pressure target value $p_2$ (15) needed for the regulation can, as shown with reference to FIG. 5, be calculated from the mixture pressure target values $p_2$ (13) and $p_2$ (14) with the help of the standardization factor x.

In the example shown, the $CH_4$ content of fuel B fluctuates between 40% and 60%. The characteristic line 10' represents the relationship between P and $p_2$ for fuel B with a $CH_4$ content of 40%, the characteristic line 10" represents the corresponding relationship in the case of a $CH_4$ content of fuel B of 60%. If not only the quality of a fuel B but also that of the other fuel A fluctuates, corresponding characteristic lines A' and A" (not represented here) must be gauged in order to correspondingly calculate the mixture pressure target value $p_2$ (14) from same.

Figure 7:
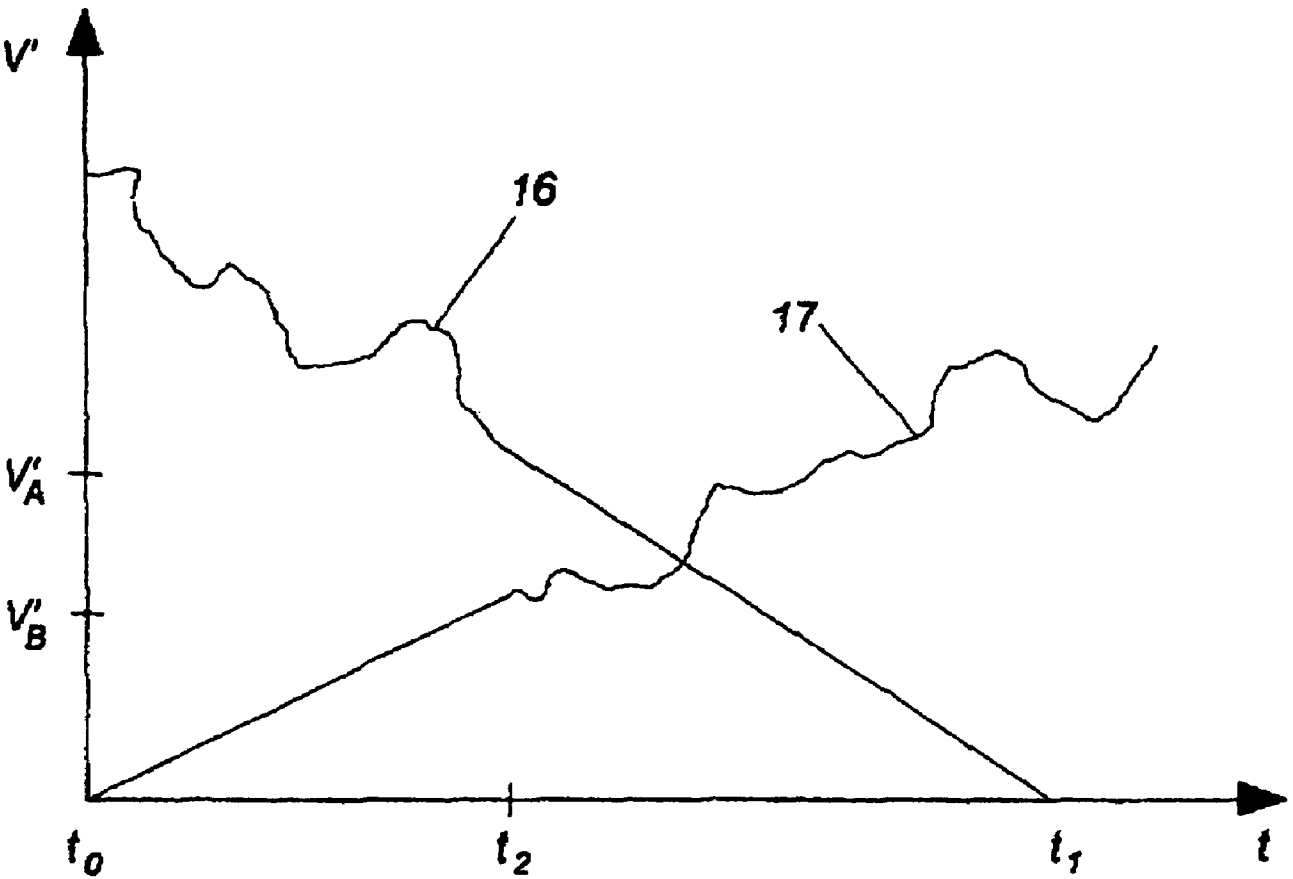

FIG. 7 shows the patterns over time of the volume flow 16 of fuel A and of the volume flow 17 of fuel B in the case of a switchover, selected by way of example, of the operation of the internal combustion engine from operation with the first fuel A to operation with the second fuel B. The operation-switchover point is reached at a preset ratio of the volume flows V'A to V'B at time $t_2$. The ratios in the operation-switchover point are favorably between 1:4 and 4:1 and particularly preferably between 1:2 and 2:1. At time's less than $t_2$ the volume flow of fuel A is regulated according to the mixture pressure target value $p_2$ (15), while the volume flow of fuel B is increased following a preset incline. At time $t_2$ the switch into a second operating mode then takes place. From this point in time on, the volume flow of fuel B is regulated according to the mixture pressure target value $p_2$ (15), while the volume flow of fuel A is reduced following a preset incline.

The invention is not limited to the shown embodiments. Thus, the method according to the invention can also be applied to the operation of an internal combustion engine with more than two fuel types, by for example controlling two fuel types according to fixed preset values, while a third fuel type is regulated. A major advantage of the method according to the invention is that even when there are changes in the mixing ratio of different fuels at any chosen point in time the reaching of the desired $NO_x$ emission values is assured. In the simplest case the method according to the invention can already be carried out on the basis of only two characteristic lines (as shown in FIG. 5), the remaining values can then be calculated online in each case or filed in corresponding characteristics fields. A precise regulation is thereby possible even with more complicated mixing systems, the fuel mixture supplied to the engine being known at any time and correspondingly able to be precisely taken into account in the regulation. When converting an internal combustion engine operated by the method according to the invention, exclusively known components, such as mixers and volume flow dosage valves, can be used.

The invention claimed is:

1. A method of regulating an internal combustion engine in order to reach presettable nitrogen oxide emission values of the internal combustion engine, comprising:

supplying the internal combustion engine at least a portion of an operating time with a first fuel and at least a portion of the operating time with a second fuel;

controlling a quantity of the first fuel supplied to the internal combustion engine per unit of time according to one of a preset control target value or a constant value; and regulating a quantity of the second fuel supplied to the internal combustion engine per unit of time by matching a mixture pressure influenced by the quantity of the second fuel in an intake of the internal combustion engine to a mixture pressure target value determined according to a delivered output and a preset nitrogen oxide emission value of the internal combustion engine so as to reach the preset nitrogen oxide emission value.

2. The method of claim 1, wherein the first fuel is a first combustible gas, and the second fuel is a second combustible gas.

3. The method of claim 1, wherein the mixture pressure target value determined according to the delivered output and the preset nitrogen oxide emission value is further determined according to corresponding target values intended for an operation of the internal combustion engine with the first fuel and for an operation of the internal combustion engine with the second fuel and further according to a standardization factor x.

4. The method of claim 3, wherein the standardization factor x is determined according to the calorific value or the $CH_4$ content of the first fuel or of the second fuel or of a fuel mixture.

5. The method of claim 3, wherein the mixture pressure target value is further determined by taking into account fluctuations in the composition of the first fuel or of the second fuel via previously determined characteristics fields or by correction values and corresponding measured values.

6. A method of regulating an internal combustion engine in order to reach presettable nitrogen oxide emission values of the internal combustion engine, comprising:

supplying the internal combustion engine at least a portion of an operating time with a first fuel and at least a portion of the operating time with a second fuel;

controlling a quantity of the first fuel supplied to the internal combustion engine per unit of time according to one of a preset control target value or a constant value; and regulating the quantity of the second fuel supplied to the internal combustion engine per unit of time by matching a λ-value influenced by the quantity of the second fuel in an exhaust of the internal combustion engine to a λ-target value determined according to a delivered output and a preset nitrogen oxide emission value of the internal combustion engine so as to reach the preset nitrogen oxide emission value.

7. The method of claim 6, wherein the first fuel is a first combustible gas, and the second fuel is a second combustible gas.

8. The method of claim 6, wherein the λ-target value determined according to the delivered output and the preset nitrogen oxide emission value is further determined according to corresponding target values intended for an operation of the internal combustion engine with the first fuel and for an operation of the internal combustion engine with the second fuel and further according to a standardization factor x.

9. The method of claim 8, wherein the standardization factor x is determined according to the calorific value or the $CH_4$ content of the first fuel or of the second fuel or of a fuel mixture.

10. The method of claim 8, wherein the λ-target value is further determined by taking into account fluctuations in the composition of the first fuel or of the second fuel via previously determined characteristics fields or by correction values and corresponding measured values.

11. A method of regulating an internal combustion engine in order to reach presettable nitrogen oxide emission values of the internal combustion engine, comprising:

supplying the internal combustion engine at least a portion of an operating time with a first fuel and at least a portion of the operating time with a second fuel;

performing a first operating mode at a first side of a preset operation-switching point, the first operating mode including:

controlling a quantity of the first fuel supplied to the internal combustion engine per unit of time according to one of a preset control target value or a constant value; and regulating the quantity of the second fuel supplied to the internal combustion engine per unit of time according to at least one recorded engine parameter so as to reach the preset nitrogen oxide emission value;

performing a second operating mode at a second side of the preset operation-switching point, the second operating mode including:

controlling a quantity of the second fuel supplied to the internal combustion engine per unit of time according to one of a preset control target value or a constant value; and regulating the quantity of the first fuel supplied to the internal combustion engine per unit of time according to at least one recorded engine parameter so as to reach the preset nitrogen oxide emission value; and switching an operating mode of the internal combustion engine between the first operating mode and the second operating mode.

12. The method of claim 11, wherein the first fuel is a first combustible gas, and the second fuel is a second combustible.

13. The method of claim 11, wherein said switching comprises switching an operating mode of the internal combustion engine so as to change a mixing ratio between the first fuel and the second fuel whereby both the first fuel and the second fuel are supplied to the internal combustion engine.

14. The method of claim 11, wherein said switching comprises switching an operating mode of the internal combustion engine such that an operation using one of the first fuel and the second fuel is replaced by an operation using the other of the first fuel and the second fuel.

15. The method of claim 11, wherein the preset operation-switching point is defined by a preset ratio between the quantity of the first fuel supplied per unit of time and the quantity of the second fuel supplied per unit of time.

16. The method of claim 15, wherein the preset ratio of the operation-switching point is between 1:4 and 4:1.

17. The method of claim 15, wherein the preset ratio of the operation-switching point is between 1:2 and 2:1.

18. A regulation section for use with an internal combustion engine, said regulation section comprising:

a fuel mixing device; and a regulator operable to control said fuel mixing device to:

supply the internal combustion engine at least a portion of an operating time with a first fuel and at least a portion of the operating time with a second fuel;

control a quantity of the first fuel supplied to the internal combustion engine per unit of time according to one of a preset control target value or a constant value; and regulate a quantity of the second fuel supplied to the internal combustion engine per unit of time by matching a mixture pressure influenced by the quantity of the second fuel in an intake of the internal combustion engine to a mixture pressure target value determined according to a delivered output and a preset nitrogen oxide emission value of the internal combustion engine so as to reach the preset nitrogen oxide emission value.

19. The regulation section of claim 18, wherein said fuel mixing device includes:

a first volume flow dosage valve for supplying the first fuel to the internal combustion engine; and a second volume flow dosage valve for supplying the second fuel to the internal combustion engine.

20. The regulation section of claim 18, wherein said fuel mixing device includes:

a volume flow dosage valve for supplying the first fuel to the internal combustion engine; and a volume flow-controllable gas mixer for receiving the second fuel and supplying the second fuel to the internal combustion engine.

21. A regulation section for use with an internal combustion engine, said regulation section comprising:

a fuel mixing device; and a regulator operable to control said fuel mixing device to:

supply the internal combustion engine at least a portion of an operating time with a first fuel and at least a portion of the operating time with a second fuel;

control a quantity of the first fuel supplied to the internal combustion engine per unit of time according to one of a preset control target value or a constant value; and regulate the quantity of the second fuel supplied to the internal combustion engine per unit of time by matching a λ-value influenced by the quantity of the second fuel in an exhaust of the internal combustion engine to a λ-target value determined according to a delivered output and a preset nitrogen oxide emission value of the internal combustion engine so as to reach the preset nitrogen oxide emission value.

22. The regulation section of claim 21, wherein said fuel mixing device includes:

a first volume flow dosage valve for supplying the first fuel to the internal combustion engine; and a second volume flow dosage valve for supplying the second fuel to the internal combustion engine.

23. The regulation section of claim 21, wherein said fuel mixing device includes:

a volume flow dosage valve for supplying the first fuel to the internal combustion engine; and a volume flow-controllable gas mixer for receiving the second fuel and supplying the second fuel to the internal combustion engine.

24. A regulation section for use with an internal combustion engine, said regulation section comprising:

a fuel mixing device; and a regulator operable to control said fuel mixing device to:

supply the internal combustion engine at least a portion of an operating time with a first fuel and at least a portion of the operating time with a second fuel;

perform a first operating mode at a first side of a preset operation-switching point, the first operating mode including:

controlling a quantity of the first fuel supplied to the internal combustion engine per unit of time according to one of a preset control target value or a constant value; and regulating the quantity of the second fuel supplied to the internal combustion engine per unit of time according to at least one recorded engine parameter so as to reach the preset nitrogen oxide emission value;

perform a second operating mode at a second side of the preset operation-switching point, the second operating mode including:

controlling a quantity of the second fuel supplied to the internal combustion engine per unit of time according to one of a preset control target value or a constant value; and regulating the quantity of the first fuel supplied to the internal combustion engine per unit of time according to at least one recorded engine parameter so as to reach the preset nitrogen oxide emission value; and switch an operating mode of the internal combustion engine between the first operating mode and the second operating mode.

25. The regulation section of claim 24, wherein said fuel mixing device includes:

a first volume flow dosage valve for supplying the first fuel to the internal combustion engine; and a second volume flow dosage valve for supplying the second fuel to the internal combustion engine.

26. The regulation section of claim 24, wherein said fuel mixing device includes:

a volume flow dosage valve for supplying the first fuel to the internal combustion engine; and a volume flow-controllable gas mixer for receiving the second fuel and supplying the second fuel to the internal combustion engine.

* * * * *